United States Patent [19]

Hoodis

[11] 4,068,967
[45] Jan. 17, 1978

[54] CORNER BRACKET FOR FRAMES

[76] Inventor: Marvin Hoodis, 14 Riviera Drive, Smithtown, N.Y. 11787

[21] Appl. No.: 735,999

[22] Filed: Oct. 27, 1976

[51] Int. Cl.² .............................................. B25G 3/36
[52] U.S. Cl. ...................................... 403/402; 52/656
[58] Field of Search ............ 403/401, 402, 403, 405, 403/406, 231; 52/656, 657, 476, 300; 160/381, 353, 374.1; 40/152, 157, 155

[56] References Cited

U.S. PATENT DOCUMENTS

| 631,352 | 8/1899 | Wilding | 403/231 |
|---|---|---|---|
| 855,777 | 6/1907 | Heberger | 403/403 |
| 891,604 | 6/1908 | Diamond | 403/403 |
| 1,562,153 | 11/1925 | Elbern | 160/374.1 |
| 1,807,186 | 5/1931 | Warner | 403/405 X |

*Primary Examiner*—Wayne L. Shedd

[57] ABSTRACT

A sheet metal bracket is provided for connecting the side sections of an annular frame. The bracket is in the form of an L-shaped body and include means that permit the body to be secured to the frame. In one embodiment of the invention, each leg of the body is provided with a pair of opposed tabs. The inner or the outer tabs are bent downwardly at a right angle to the plane of the body. In a second embodiment of the invention only inside tabs are provided with the free end of the tabs being bent at an obtuse angle with respect to the remainder of the tab whereby the bent portion of the tab is adapted to engage the outside surface of a second frame that is inward of the first frame. As a modification of the second embodiment each of the tabs is provided with an aperture therethrough so that a suitable fastener may secure the bracket to the outside surface of a second frame that is inward of the first frame.

15 Claims, 8 Drawing Figures

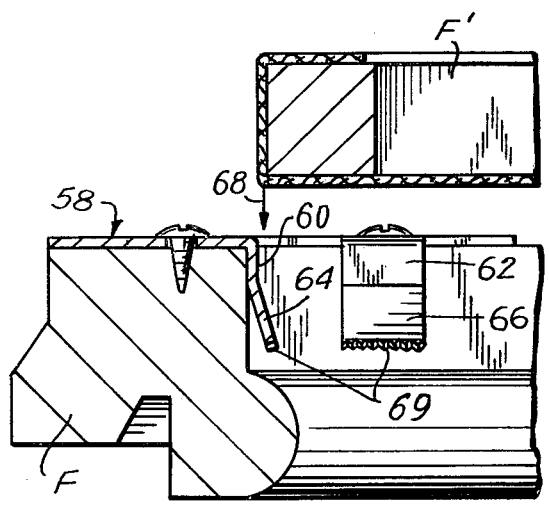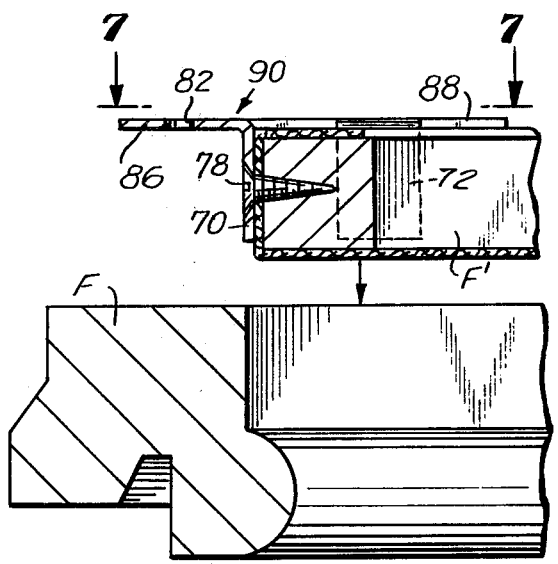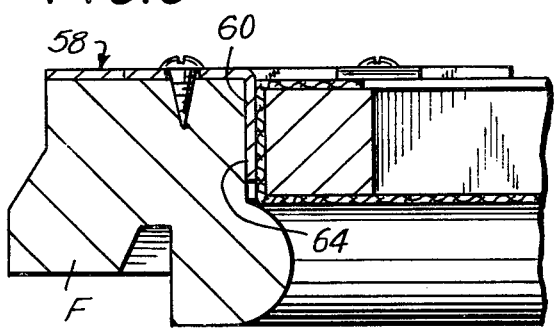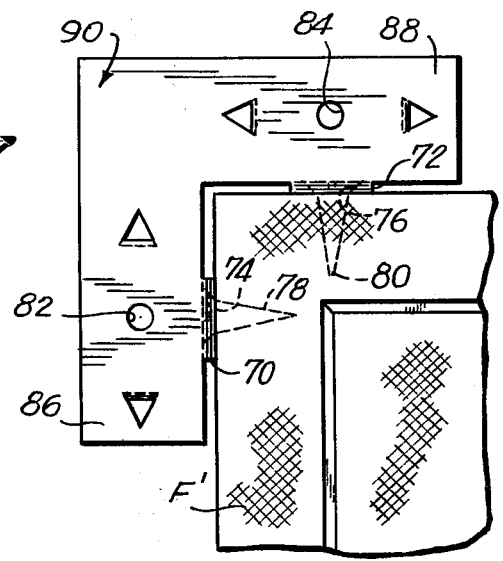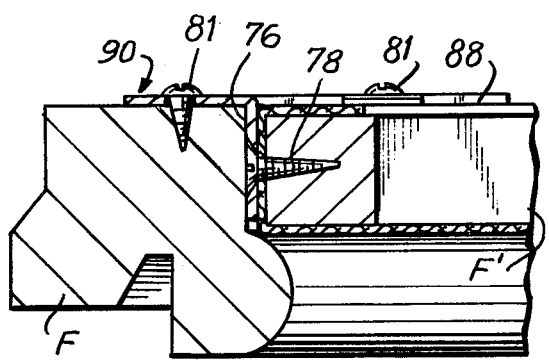

CORNER BRACKET FOR FRAMES

BACKGROUND OF THE INVENTION

1. Field of the Invention

The present invention relates generally to bracket means for connecting the side sections of an annular frame and more particularly to bracket means for connecting the mitered corners of an annular frame.

2. Description of the Prior Art

Frames, such as are commonly used with paintings, needlepoint, or the like, are frequently made with mitered corners. Normally, on prefabricated frames, there is little need for the user to be concerned about the squareness of the corners since the miters can be made fairly accurately with conventional, production machinery. Only if the frame is in need of repair will there be any problem with maintaining the corners perfectly square. However, there is a large market for "do-it-yourself" frames wherein the side sections of the frame are secured to each other by the ultimate user who may not have sufficiently accurate equipment for making a perfectly square corner. Accordingly, there is a substantial need for a low cost, simple yet effective bracket that will assure a perfectly square corner for a frame, particularly, but of course not limited to those frames that are assembled by the user.

There are many examples in the prior art of brackets that are intended to assist in the formation of the corner of a frame. For example, U.S. Pat. No. 132,114 discloses an L-shaped bracket having an opening in each leg thereof, so that the bracket may be secured to adjacent sections of a frame that has a mitered corner. While the structure disclosed in U.S. Pat. No. 132,114 is perfectly adequate for its intended purpose, it will be appreciated that, if there is any inaccuracy in the mitered corner, then the frame will not be square since the bracket does not provide any means for orienting one section with respect to the other. That is, there are no tabs provided in the patented bracket with the tabs being at right angles to each other to thereby assure that the frame will be square.

U.S. Pat. No. 254,965 discloses still another corner bracket which is comprised of a first L-shaped portion defined by first and second legs and a second L-shaped portion defined by first and second legs with said first and said second L-shaped portions being at a right angle with respect to each other. The first L-shaped portion serves to join two adjacent sections of a frame while a second L-shaped portion assures that the frame sections are perpendicular to each other. Once again, the structure disclosed in U.S. Pat. No. 254,965 is perfectly adequate for its intended purpose. However, it will be appreciated that no means are provided for squaring the outside surface of the frame.

Still another example of the prior art is disclosed in U.S. Pat. No. 1,402,304. In this last mentioned patent an L-shaped bracket is provided with sharp prongs punched outwardy therefrom and with holes for receiving the shank of several screws that are used for securing the bracket to a frame. The pointed prongs are intended to bite into the frame for purposes of assuring rigidity. However, as pointed out in connection with the first described example of the prior art, no means are provided for assuring that the frame sections are perfectly square with respect to each other. That is, the bracket could be applied in a skewed condition and thus the frame will not be square if the mitered joint is not perfect. The absence of right angle tabs precludes the possibility of the bracket shown in U.S. Pat. No. 1,402,304 from squaring the frame.

In U.S. Pat. No. 2,340,924, there is disclosed a cleat that is L-shaped in one embodiment thereof and which is arranged to secure a mitered corner of the frame on the inside surface thereof. Holes are provided in the cleat for receiving fasteners that engage the frame sections and sharp pointed prongs are also provided for engaging the frame sections. It will be appreciated, however, that means have not been provided in U.S. Pat. No. 2,340,924 for accommodating the outside surface of a mitered corner. Nor in this last mentioned U.S. patent is there any means by which a second, inner frame may be automatically squared and coupled to a first outer frame.

U.S. Pat. No. 2,400,266 also discloses another cleat that is adaptable to either or both inside and outside corners of a frame. It will be noted however, that this last mentioned structure is not applicable to a mitered corner such as is normally found in a picture frame.

U.S. Pat. No. 2,519,628 discloses a corner bracket for a curtain stretcher that is similar in both construction and function to U.S. Pat. No. 254,965 discussed hereinabove and contains the deficiencies thereof. For example, in U.S. Pat. No. 2,519,628, no means are provided for engaging the inside surface of an annular frame. Nor are means provided for automatically squaring and coupling a second inner frame to a first outer annular frame.

U.S. Pat. No. 2,857,635 discloses a complex device for forming a miter joint. The structure disclosed in this last mentioned U.S. Patent requires a continuous groove in the frame for receiving the bracket and therefore is of limited applicability. In any event, no means are disclosed or suggested for engaging either the inner or the outer surfaces of an annular frame. Nor are means provided for coupling a second inner frame to an annular frame.

Finally, there is disclosed in U.S. Pat. No. 2,947,391 a device similar to that disclosed in U.S. Pat. No. 2,857,635 in that a special grooved construction is required in order for the device to be operable. Once again, no means are provided that will render the patented bracket adaptable to both the inside and outside edges of an annular frame. Nor are means taught that will permit both the squaring and coupling of a second inner frame to a first annular outer frame.

SUMMARY OF THE INVENTION

The present invention overcomes the shortcomings inherent in the prior art and provides a bracket for connecting the side sections of an annular frame to each other. The bracket comprising the present invention includes a substantially L-shaped body that is defined by first and second legs. Openings may be formed through the legs of the bracket to receive a screw or other comparable fastener means whereby the body may be secured to a portion of the frame. In addition, or alternatively to the screw holes, sharp pointed prongs may be stamped out of the bracket so as to engage the frame and thereby retain the bracket on a surface thereof.

In one embodiment of the present invention, each leg of the bracket is provided with a pair of oppositely directed tabs along the longitudinal side edges thereof. When it is convenient, the inwardly directed tabs may be bent downwardly to a plane perpendicular to that of the body portion whereby the tabs engage the inner surface of an annular frame. Since the legs of the bracket are at a right angle with respect to each other and since the tabs are bent into planes that are perpendicular to the plane of the body, the bent tabs will automatically square up the frame sections regardless of the accuracy of the mitered joint. For other applications, it may be more convenient to engage the outer surface of the frame and for this purpose, only the outer tabs are bent at a right angle to the plane of the body. The inside tabs are left in the same plane as the body.

In an alternative embodiment of the present invention only inside tabs are provided and these tabs, in addition to being perpendicular to the plane of the body are each provided with a bent section that forms an obtuse angle with respect to the remainder of the tab. In this manner, the bent section of the tab provides means for interferring with and retentively engaging a second inner frame within the first annular outer frame. As a modification of this second embodiment, the bent section may be dispensed with and an opening may be provided through the tab. In the modification of the second embodiment of this invention, fastener means are used for first securing the bracket to the second inner frame. The bracket may then be secured to the outer frame in a manner described hereinabove.

As used hereinafter, the term "tab means" is intended to be generic to both embodiments and both modifications thereof. That is, the term "tab means" is intended to define either a pair of opposed tabs on each leg of the bracket as described in connection with the first embodiment and the modification thereof as well as only a single tab on each leg of the bracket as described in connection with the second embodiment as well as the modification thereof.

Accordingly, it is an object of the present invention to provide an improved bracket for connecting the side sections of an annular frame.

It is another object of the present invention to provide an improved bracket, as described above, whereby means are included for engaging either the inside or the outside surface of the annular frame.

Yet another object of the present invention is to provide an improved bracket, as described above, wherein means are provided for coupling a second inner frame to a first annular outer frame.

An additional object of the present invention is to provide an improved bracket, as described above, wherein means are provided for simultaneously squaring and coupling a second inner frame to a first annular outer frame.

These and other objects, features and advantages of the invention will, in part, be pointed out with particularity and will, in part, become obvious from the following more detailed description of the invention, taken in conjunction with the accompanying drawing which forms an integral part thereof.

BRIEF DESCRIPTION OF THE DRAWINGS

In the various figures of the drawing, like reference characters designate like parts. In the drawing:

FIG. 4 is an exploded view partially in section illustrating a second embodiment of the present invention;

FIG. 5 is a sectional elevational view illustrating the structure shown in FIG. 4 in the fully assembled condition;

FIG. 6 is an exploded sectional elevational view illustrating a modification of the second embodiment of the present invention, FIG. 7 is a plan view taken along line 7—7 of FIG. 6; and FIG. 8 is a sectional elevational view illustrating the structure shown in FIG. 6 and FIG. 7 in the fully assembled condition.

DESCRIPTION OF THE PREFERRED EMBODIMENT

Figure 1:
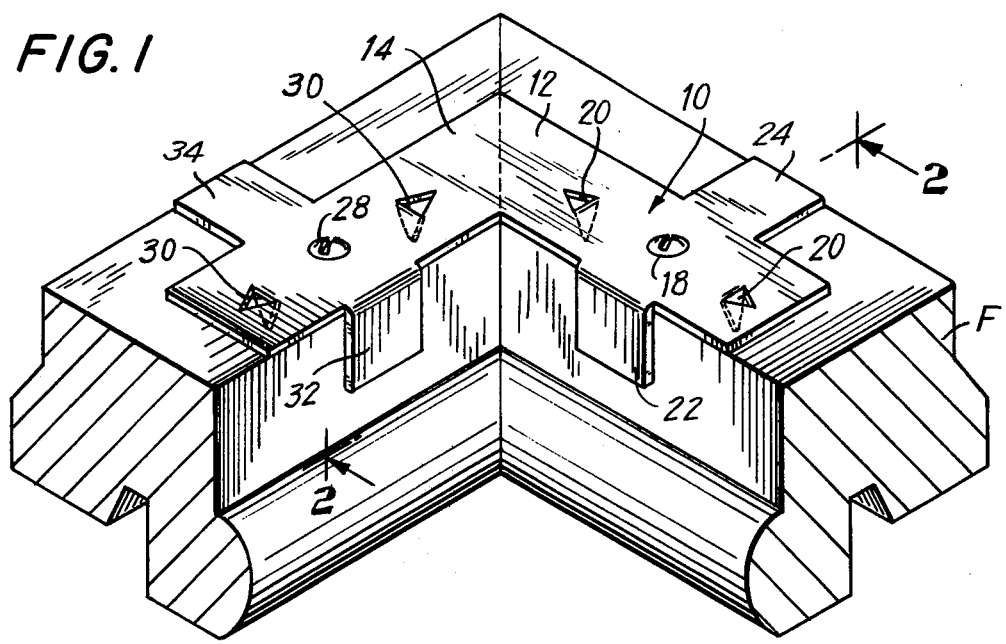
FIG. 1 is a perspective view illustrating a first embodiment of the bracket comprising the present invention.
Figure 2:
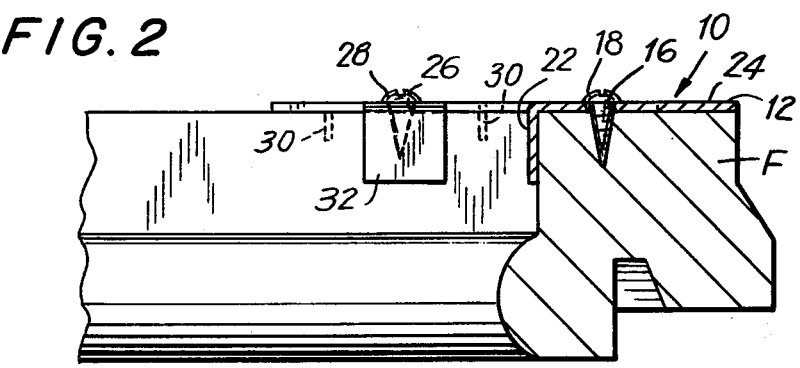
FIG. 2 is a transverse sectional elevational view taken along line 2—2 of FIG. 1.

Referring now to the drawings and in particular to FIG. 1 and to FIG. 2 there is shown a bracket 10 comprising the first embodiment of the present invention. The bracket 10 is comprised of an L-shaped body portion defined by legs 12 and 14 that are in a common plane and at a right angle with respect to each other. The leg 12 is provided with an aperture 16 through which a fastener such as a screw 18 passes so as to engage the rearward surface of a first annular frame F. The leg 12 is further provided with sharp, pointed prongs 20 which are struck from the body portion and are adapted to engage the rear surface of the frame F. In addition, the leg 12 is further provided with a first inner tab 22 that is bent at a right angle with respect to the plane of the leg 12 and a second outer tab 24 that is coplaner with the leg 12.

Similarly, the second leg 14 of the bracket 10 is provided with an aperture 26 for receiving a fastener such as a screw 28. A plurality of sharp pointed prongs 30 are also formed in the leg 14 in the same manner and for the same purpose as the prongs 20 in the leg 12. The leg 14 is also provided with a first inner tab 32 that is bent at a right angle with respect to the plane of the leg 14 and a second outer tab 34 that is coplaner with the leg 14.

Figure 3:
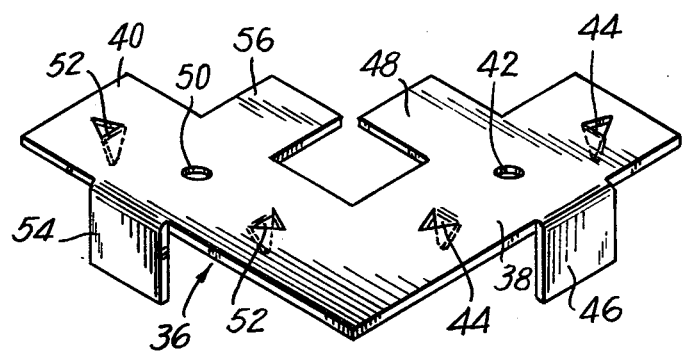
FIG. 3 is a perspective view illustrating a modification of the first embodiment of the present invention shown in FIG. 1 and FIG. 2.

It will be appreciated that, in the first embodiment of the present invention, the tabs 22 and 32 are arranged to engage the inside surface of the annular frame F. Since the tabs 22 and 32 are at a right angle with respect to each other and are each at a right angle with respect to its respective leg 12 and 14, the frame F will be assembled square regardless of any imperfections in the mitered corner. FIG. 3 illustrates a modification of the embodiment shown in FIG. 1. The bracket 36 shown in FIG. 3 is comprised of a body portion defined by first and second legs 38 and 40, respectively, which are at a right angle with respect to each other. The leg 38 is provided with an opening 42 for receiving a fastener whereby the bracket 36 may be secured to the rear surface of a frame. The leg 38 is also provided with a pair of sharp, pointed prongs 44 that are also adapted to engage the rear surface of the frame upon which the bracket 36 will be mounted. Finally, the leg 38 is provided with a first outer tab 46 that is bent at a right angle with respect to the plane of the leg 38. A second inner tab 48 is integral and coplaner with the leg 38.

In the same manner, the second leg 40 of the bracket 36 is provided with an opening 50 and a pair of sharp pointed prongs 52. A first outer tab 54 is formed integrally with the side edge of the leg 40 and is bent at a right angle with respect to the plane thereof. A second inner tab 56 is integral and coplaner with the leg 40.

It will be appreciated that, with the modifications of the first embodiment of this invention shown in FIG. 3 the tabs 46 and 54 are arranged to engage the outside surface of the frame on which the bracket 36 is mounted while the inner tabs 48 and 56 are arranged to rest on the rear surface of the frame.

Another embodiment of the present invention is shown in FIG. 4 and in FIG. 5. In the second embodiment of this invention a bracket generally designated by the reference character 58 is intended to couple and retentively engage the second, inner frame with respect to a first outer annular frame. By way of example, the second inner frame, generally designated by the reference character F' may be a canvas stretcher or may be any other form of frame, for example the type used for mounting needlepoint. In any event, the bracket 58 is functionally and structurally similar to that shown in the FIG. 1 embodiment in the sense that the inner surface of the outer frame F is to be engaged. For this reason, only inner tabs 60 and 62 are provided. The free end of each of the tabs 60 and 62 includes an inwardly bent section 64 and 66, respectively. It will be noted that the inwardly bent sections 64 and 66 form an obtuse angle with respect to the remaining portion of the tab 60 and 62, respectively, and, when the bracket 58 is secured to frame F, the sections 64 and 66 are arranged so that they interfer with the inward movement of the frame F' which is shown by the arrow 68. Thus, when the frames F and F' are assembled, such as shown in FIG. 5, the bent sections 64 and 66 will be deflected in a direction towards the frame F and the inherent resiliency of the bent section 64 and 66 will retentively engage and hold the inner frame F'. As an optional feature the free end of each of the bent sections 64 and 66 may be provided with teeth or serrations 69 such as are illustrated schematically in FIG. 4. The teeth or serrations are intended to bite into the inner frame F' in order to affect a somewhate greater holding power and to preclude or at least minimize the likihood of subsequent separation of the two frames F and F'.

FIGS. 6-8 illustrate a modification of the embodiment of the present invention shown in FIG. 4 and in FIG. 5. The structure is FIGS. 6-8 is functionally the same as that shown in FIG. 4 and FIG. 5. However, in the modification, the inwardly bent tab sections 64 and 66 are dispensed with. Instead, tabs 70 and 72 are provided with apertures 74 and 76, respectively, for receiving screws 78 and 80, respectively. The screws 78 and 80 are first secured to the inner frame F'. Screws 81, which pass through apertures 82 and 84, also pass through legs 86 and 88, respectively, and are thus used for securing the bracket 90 to the annular outer frame F. It will be appreciated that with the modification of FIGS. 6-8, the tabs 70 and 72 serve to square the frame F' while the bracket 90 serves the dual function of coupling the inner frame F' to the outer frame F and also squaring the outer frame F.

From the foregoing it will be readily apparent that an improved bracket has been provided for connecting the side sections of an annular frame to each other. In addition, an alternative embodiment of the present invention also provides means for coupling an inner frame to an annular outer frame. The second embodiment of this invention serves to square an annular outer frame, and, in addition, assures that the inner frame is also square.

As used herein the terms "frame" and "annular frame" are intended to be generic to the moldings commonly used for framing paintings, photographs, charts, needlepoint, etc.

There has been disclosed heretofore the best embodiments of the invention presently contemplated. However, it is to be understood that various changes and modifications may be made by those skilled in the art without departing from the spirit of the invention.

What I claim as new and desire to secure by Letters Patent is:

1. A bracket for connecting the side sections of an annular frame, said bracket comprising:
   a. a substantially L-shaped body defined by first and second legs;
   b. connecting means integral with said legs for permitting said body to be secured to a portion of the frame; and
   c. at least two spacedly opposed tab means integral with each said leg along opposite side edges thereof, at least a portion of one of said tab means integral with each said leg being in planes that are perpendicular to each other and parallel to the side edges of said legs with the other of said tab means integral with each said leg being co-planar with said respective leg whereby said portions of said one tab means are adapted to retentively engage the side sections of the frame on the inside or outside surface thereof.

2. The bracket according to claim 1 wherein each said tab means includes coupling means integral therewith for permitting said body to be secured to a second frame that is inward of the first frame.

3. The bracket according to claim 2 wherein said coupling means is comprised of a section of each said tab means with said section being bent to form an obtuse angle with respect to the remainder of said tab means, said section of said tab means being positioned so as to interfer with and thereby frictionally engage the side sections of the second frame that are inward of the first frame.

4. The bracked according to claim 3 wherein at least said tab means is inherently resilient.

5. The bracket according to claim 3 wherein said coupling means is defined by an aperture in said tab means for receiving a fastener that is adapted to engage the second frame.

6. A bracket for connecting the side sections of a first annular frame to each other and for coupling a second, inner frame, to the first frame, said bracket comprising:
   a. a substantially L-shaped body defined by first and second legs;
   b. connecting means integral with said legs for permitting said body to be secured to a portion of the frame;
   c. tab means integral with each said leg, at least a portion of said tab means being in planes that are perpendicular to each other and parallel to the side edges of said legs; and
   d. coupling means integral with said tab means for permitting said body to be secured to a second frame that is inward of the first frame.

7. The bracket according to claim 6 wherein said coupling means is defined by an aperture in said tab means for receiving a fastener that is adapted to engage the second frame.

8. A bracket for connecting the side sections of an annular frame, said bracket comprising:

a. a substantially L-shaped body defined by first and second legs;
b. connecting means integral with said legs for permitting said body to be secured to a portion of the frame; and
c. tab means integral with each said leg, at least a portion of said tab means being in planes that are perpendicular to each other and parallel to the side edges of said legs whereby said portions of said tab means are adapted to retentively engage the side sections of the frame, said tab means including coupling means integral therewith for permitting said body to be secured to a second frame that is inward of the first frame, said coupling means comprising a section of each said tab means with said section being bent to form an obtuse angle with respect to the remainder of said tab means, said section of said tab means being positioned so as to interfere with and thereby frictionally engage the side sections of the second frame that is inward of the first frame.

9. The bracket according to claim 8 wherein said portions of said tab means are arranged to engage the inside surface of the first frame.

10. The bracket according to claim 8 wherein at least said section of said tab means is inherently resilient.

11. The bracket according to claim 8 wherein said coupling means is defined by an aperture in said tab means for receiving a fastener that is adapted to engage the second frame.

12. A bracket for connecting the side sections of a first annular frame to each other and for coupling a second, inner frame to the first frame, said bracket comprising:
a. a substantially L-shaped body defined by first and second legs;
b. connecting means integral with said legs for permitting said body to be secured to a portion of the frame;
c. tab means integral with each said leg, at least a portion of said tab means being in planes that are perpendicular to each other and parallel to the side edges of said legs; and
d. coupling means integral with said tab means for permitting said body to be secured to a second frame that is inward of the first frame, said coupling means being comprised of a section of each said tab means with said section being bent to form an obtuse angle with respect to the remainder of said tab means, said section of said tab means being positioned so as to interfere with and thereby frictionally engage the side sections of the second frame that is inward of the first frame.

13. The bracket according to claim 12 wherein said coupling means is defined by an aperture in said tab means for receiving a fastener that is adapted to engage the second frame.

14. The bracket according to claim 13 wherein the free end of each said bent sections includes serrations therealong.

15. The bracket according to claim 13 wherein at least said bent section of said tab means is inherently resilient.

* * * * *